(12) United States Patent
Amin-Sanayei et al.

(10) Patent No.: US 7,081,216 B2
(45) Date of Patent: Jul. 25, 2006

(54) FOAMS AND COATINGS

(75) Inventors: Ramin Amin-Sanayei, King of Prussia, PA (US); Lawrence K. Wempe, Upper Saucon, PA (US); Kurt Arthur Wood, Abington, PA (US); Stefano Finocchiaro, Viadana (IT); Delphine Tillier, Eindhoven (NL)

(73) Assignee: Arkema Inc., Philadelphia, PA (US)

( * ) Notice: Subject to any disclaimer, the term of this patent is extended or adjusted under 35 U.S.C. 154(b) by 353 days.

(21) Appl. No.: 10/134,262

(22) Filed: Apr. 29, 2002

(65) Prior Publication Data

US 2003/0077455 A1  Apr. 24, 2003

Related U.S. Application Data

(63) Continuation-in-part of application No. PCT/US02/03559, filed on Feb. 6, 2002.

(60) Provisional application No. 60/268,843, filed on Feb. 15, 2001.

(51) Int. Cl.
 *B29C 67/20* (2006.01)
(52) U.S. Cl. .......................... 264/28; 264/41; 264/344; 521/61
(58) Field of Classification Search ................ 427/215, 427/220; 264/28, 129, 41, 344; 521/61
See application file for complete search history.

(56) References Cited

U.S. PATENT DOCUMENTS

| | | | | |
|---|---|---|---|---|
| 3,376,158 A | | 4/1968 | Buser | 117/119 |
| 4,125,673 A | | 11/1978 | Roth et al. | 428/447 |
| 4,141,873 A | | 2/1979 | Dohany | 260/29.6 |
| 4,183,837 A | * | 1/1980 | Tamura et al. | 524/108 |
| 4,271,639 A | | 6/1981 | Talalay et al. | 51/322 |
| 4,347,268 A | | 8/1982 | Close | 427/385 |
| 4,384,047 A | * | 5/1983 | Benzinger et al. | 521/64 |
| 4,504,528 A | | 3/1985 | Zucker et al. | |
| 4,510,282 A | * | 4/1985 | Goll | 524/337 |
| 4,618,641 A | | 10/1986 | Hengel | 524/284 |
| 4,664,857 A | * | 5/1987 | Nambu | 264/28 |
| 4,764,431 A | | 8/1988 | Piacenti et al. | 428/421 |
| 4,863,788 A | * | 9/1989 | Bellairs et al. | 442/374 |
| 4,983,459 A | | 1/1991 | Franz et al. | 428/410 |
| 4,985,282 A | | 1/1991 | Moggi et al. | 427/393 |
| 4,997,684 A | | 3/1991 | Franz et al. | 427/384 |
| 5,212,016 A | | 5/1993 | Mascia et al. | 428/422 |
| 5,366,671 A | * | 11/1994 | Kimura | 264/28 |
| 5,653,927 A | * | 8/1997 | Flynn et al. | 264/134 |
| 5,723,508 A | * | 3/1998 | Healy et al. | 521/61 |
| 6,596,207 B1 | * | 7/2003 | Gunn | 264/45.9 |

FOREIGN PATENT DOCUMENTS

| | | |
|---|---|---|
| DE | 4011801 A | 10/1991 |
| EP | 481283 | 4/1996 |
| EP | 739869 | 10/1996 |

OTHER PUBLICATIONS

Chem Abstracts CAN, 1968, Abstract of Russian article, 70:79210.

* cited by examiner

*Primary Examiner*—Allan R. Kuhns
(74) *Attorney, Agent, or Firm*—Thomas F. Roland

(57) ABSTRACT

Processes for the preparation of adherent polyvinylidene fluoride, hexafluoropropylene coatings on objects and for the direct production of open celled foams from a polymer latex without a need for any blowing agent.

7 Claims, No Drawings

US 7,081,216 B2

FOAMS AND COATINGS

This application is a continuation-in-part of co-pending U.S. international application no. PCT/US02/03559 filed Feb. 6, 2002 which in turn claims the priority of provisional U.S. application No. 60/268,843, filed Feb. 15, 2001.

BACKGROUND OF THE INVENTION

This invention relates to novel processes for direct production of foamed articles from a polymer latex without a need for any chemical or mechanical blowing agent, as well as to processes for the adherent coating of a substrate with a water-borne polymer. In the foam process, articles are produced by freezing of the latex in a mold, followed by removal of the water, to give a foam having an open cell structure with foam density inversely affected by the level of solids in the latex. "Mold" is used in a broad sense to cover three dimensional molds as well as objects onto which the dispersion to be foamed is applied, such as by spraying or dipping. The foams are used in a variety of applications such as comfort cushioning in automobiles and airplanes; for thermal and acoustic insulation; for shock absorption; and the like. The coatings are applied to a wide variety of substrates such as metal, glass, stone, brick, tile, cementitious materials, mortar, natural and synthetic fibers, cloth, paper, leather, and woven and nonwoven fabrics.

An example of polymers for these applications are fluoropolymers, more specifically copolymers of vinylidene fluoride (VDF) and hexafluoropropylene (HFP) and still more specifically copolymers having very low or no crystallinity. For coatings, the copolymers at all levels of HFP content remain highly flexible, thermoplastic copolymers which show low surface tack even at high HFP levels and thereby permit use of such copolymers in unique applications for which polyvinylidene fluoride homo- and copolymers previously known were not considered suitable, or were considered suitable only when combined with other polymers or other materials such as primers and the like.

Low crystallinity fluorinated polymers are highly useful, particularly as coating and encapsulants, because of their low surface energy, low refractive index, good chemical resistance, and the relative ease of coating or encapsulating objects with such inert polymers. The balance between amorphous and crystalline regions, the nature and extent of the crystalline regions, and the interphase between these regions affects the processability options to obtain articles having the beneficial attributes and hence, the ultimate applications for a given resin composition. Low crystallinity fluorinated polymers are defined in WO 01/32726, the disclosure of which is incorporated herein by reference.

Copolymers of VDF and HFP vary in their properties. At one end of the spectrum there are totally amorphous thermoplastic polymers and at the other extreme the highly crystalline polymers. The microstructure of the polymer chain determines the flexibility (or alternately the stiffness) at a given temperature. This mechanical behavior is controlled by the type and amount of the crystalline phase (if any) and the dynamics of the molecular motion along the chain such that at some temperature the polymer undergoes a second order change in response to applied stresses, the so-called glass transition temperature (Tg). Above the Tg the polymer chain has molecular motions which are free to rotate, stretch, etc. and thereby absorb the energy input. Below the Tg the molecular motions are frozen and the stresses may lead to brittle fracture or glass-like behavior.

Applicant is not aware of prior art disclosing the foam process. However, certain prior art is noted below relating to coating applications.

PRIOR ART

U.S. Pat. No. 4,618,641 discloses treatment of fabric with concentrated dispersions of vinylidene fluoride copolymers stabilized with nonhalogenated carboxylic acid surfactants. High solids concentrations are required and the fabric treatments must be heat set. The present invention using the copolymers described herein are able to accomplish the same or better treatment results using lower solids concentrations, while avoiding the need for a specific class of detergents.

U.S. Pat. Nos. 4,983,459 and 4,997,684 disclose methods of treatment and the dirt, stain repellant and non wetting surfaced articles treated with a mixture of a perfluoroalkyl silane and a fluorinated olefin telomer. The surfaces treated are stated to be glass compositions, or other inorganic surfaces such as ceramics, enamels, metal or metal oxide films. The formula given for the fluorinated telomer excludes the copolymer of this invention and the present invention provides an adherent coating on glass, metal and other mineral, ceramic and the like surfaces without the need of any silane additive primer coat.

Chem. Abstracts: CAN 70:79210, abstracting Mekh. Polim (1968) 4(6), 1065–70 summarizes the effect on the adhesive properties due to treatment of a film of semicrystalline VDF/HFP copolymers on steel, and window glass. The steel and glass coated with the film were subjected to treatment at 200 to 280° for 1 to 120 minutes. Treatment of the film coated steel at 280° C. for 2 hours greatly improved adhesion of the film and resistance to boiling water due to formation of $Fe_2O_3$ under the coating. HCl and $HNO_3$ introduced at the interface between the film and either glass or steel reduced adhesion. While the abstract concludes that adhesion is possible at temperatures below the melting point of the film no actual values are provided. Given the fact that later literature indicates that satisfactory adhesion of VDF homo-and copolymers including these with HFP known prior to the copolymer used in the present application required alloying with nonfluoropolymers at least the use of primer coats for satisfactory adhesion to substrates such as glass and steel, this abstract provides no information which would lead one having knowledge in the art to discover the unique use properties applicants have found for the VDF/HFP copolymers described and used herein.

U.S. Pat. No. 4,347,268 discloses coatings made from metallic oxide free solvent solutions of elastomeric copolymers of HFP and VDF in the VDF/HFP concentration ranges of U.S. Pat. No. 3,051,677 and a vinyl copolymer by applying the solution to a surface and evaporating the solvent. Suitable substances for coating are stated to be aluminum, steel, glass, EPDM and nitrile rubber.

U.S. Pat. No. 4,764,431, corresponding to EP 0192 494 BI discloses the use of solvent solutions of copolymers of VDF and HFP in the VDF/HFP concentration ranges of U.S. Pat. No. 3,051,677 for applying coatings for protecting and consolidating stone materials.

EP 0481 283 BI corresponding to U.S. Pat. Nos. 5,219,661 and 5,270,115 discloses solvent based reversible polymer gels for treating and consolidating stone materials and impregnating various fabrics including glass cloth. One essential material is an elastomeric VDF/HFP copolymer in the VDF/HFP concentration ranges of U.S. Pat. No. 3,051,677 and a second essential component is a polymer selected from non elastomeric vinylidene fluoride polymer or copolymer, a vinyl fluoride polymer or a (meth)acrylate polymer or copolymer.

U.S. Pat. No. 4,141,873 describes an aqueous based vinylidene fluoride polymer film forming suspension for coating various substrates which also contains a suspension of a (meth)acrylate polymer and a water dispersible latent solvent for the two polymers.

U.S. Pat. No. 4,985,282 corresponding to EP 0374 803 BI discloses the protection of surfaces of stony materials, tiles, cement conglomerates and relevant manufactured articles by applying a mixture of an aqueous dispersion of a VDF/HFP elastomer in the VDF/HFP concentration ranges of U.S. Pat. No. 3,051,677 and an aqueous emulsion or microemulsion of a perfluoropolyether by conventional methods to such surfaces.

U.S. Pat. No. 5,212,016 corresponding to EP 0479 240 BI describes consolidating of and protection of surfaces of stone, marble, sandstone, bricks concrete and articles manufactured therefrom by applying solvent solution of an mixture of a then known nonelastomeric polyvinylidene fluoride homo- or copolymer or a polyalkyl methacrylate and an elastomeric copolymer of VDF and HFP in the VDF/HFP concentration range of U.S. Pat. No. 3,051,677.

U.S. Pat. No. 4,125,673 teaches rendering the surfaces of inorganic materials olephobic and hydrophobic by applying to their surfaces a solution or dispersion of a fluorine containing organic polymer or a solution of a water soluble polymer of an unsaturated carboxylic acid and solution of an organosilicon compound.

EP 0739 869 AI teaches improving the reinforcing power and protective effectiveness of the separate components by combining in an aqueous composition an inorganic silicate or colloidal silica and a fluoroelastomer based on VDF and HFP in the VDF/HFP concentration range of U.S. Pat. No. 3,051,677 optionally containing other comonomers.

SUMMARY OF INVENTION

With respect to the first, foam aspect of this invention, there is provided a process for the direct manufacture of cellular articles by freezing of the latex or suspension of a polymer in an aqueous media where the cellular article will have an open celled structure, the process comprising (a) preparing a latex or suspension of the polymer in water where the polymer is present in a dispersed phase and placing the said latex or suspension into a mold, (b) chilling the mold below the freezing point of the said aqueous phase, (c) removing the frozen material from the mold, and (d) removing the water from the frozen material to permit recovery of the foam, steps (c) and (d) being carried out, for example, by thawing of the frozen material and draining of the aqueous phase, or by evaporation of the aqueous phase. The polymer in the dispersed phase should have coalescability below the freezing point of the aqueous phase and should possess a reasonable structural rigidity and integrity to maintain its cellular structure at its use temperature. The coalescability can be improved by adding coalescing agent or solvent to the latex. The structural rigidity of the polymer phase can stem from crystallinity, glassiness, crosslinking, or by adding reinforcements such as fibrous material or particulates. This process is applicable to a wide variety of polymers such as semi-crystalline polymers with low Tg such as ethylene-vinylacetate copolymers, polychloroprene, and fluoropolymers with low crystallinity content such as VDF-HFP, CTFE-HFP, TFE-PMVE, VDF-TFE-HFP and mixtures thereof with compatible glassy polymers, where CTFE equals chlorotrifluoroethylene, TFE equals trifluoroethylene, and PMVE equals perfluoromethyl vinyl ether. A preferred class of polymers for the foam application have low internal crystallinity and a Tg and a minimum film formation temperature (MFFT) less than the freezing point of the aqueous phase of a latex or suspension containing such polymer in a dispersed phase. The ratio of the foam density to the density of the pure solid phase should be less than about 0.9 for most applications.

There are various aspects to the second, coating embodiment of this invention. Thus, there is provided (a) a process for the adherent coating of a substrate with a vinylidene fluoride based polymer having low crystallinity which consists of applying an aqueous suspension or emulsion of said polymer to said substrate, evaporating the water and any other volatile materials in said aqueous suspension or emulsion, and then, optionally, heating the substrate on which said adherent coating has been applied, the substrate being selected from (i) metal, glass, stone, brick, tile, cementitious materials, or mortar or (ii) natural and synthetic fibers, cloth, paper, leather, or woven and non-woven fabrics; (b) a process for the adherent coating of a substrate selected from natural and synthetic fibers, cloth, paper, leather, and woven and non-woven fabrics with a vinylidene fluoride, hexafluoropropylene copolymer which consists of applying an aqueous suspension or emulsion, organic solvent solution, or organic solvent suspension of said vinylidene fluoride, hexafluoropropylene copolymer to said substrate and evaporating the water and any other volatile materials in said aqueous suspension or emulsion or the solvent from said solvent solution or suspension and then, optionally heating the substrate on which said adherent coating has been applied; (c) a process for the application of a self adherent polyvinylidene fluoride based polymer film coating on a substrate which comprises applying a latex of a polyvinylidene fluoride, hexafluoropropylene copolymer having low internal crystallinity on said substrate, evaporating the aqueous phase of the latex to create the film and heating of the film, the substrate being selected from (i) metal, glass, stone, brick, tile, cementitious materials, or mortar or (ii) natural and synthetic fibers, cloth, paper, leather, or woven and non-woven fabrics; (d) a process for the application of a self adherent polyvinylidene fluoride based polymer film coating on a substrate selected from natural and synthetic fibers, cloth, paper, leather, and woven and non-woven fabrics, which process comprises applying a latex or solvent solution of a polyvinylidene fluoride, hexafluoropropylene copolymer on said substrate and evaporating the aqueous phase of the latex or the solvent of the solution; and (e) a process for the application of a clear and self adherent polyvinylidene fluoride based polymer film coating on a substrate which comprises applying on said substrate a latex of a polyvinylidene fluoride based polymer which contains triethylphosphate, evaporating the aqueous phase of the latex to create the film and heating the film, the substrate being selected from metal and glass.

The preferred VDF-based polymers employed by the invention are conveniently made by an emulsion polymerization process, but suspension and solution processes may also be used.

The coated porous surfaces provided by the second process aspect of the invention are moisture and oil resistant, as well as breathable, vapor transmittent, water repellent and fire retardant, while retaining the original feel and look of the surface on which the coating was applied. Particular mention is made that the surfaces to be coated may be natural and/or artificial materials either in fiber form or on the surface of larger flat or three dimensional objects which may be natural stone such as marble, limestone, granite, man made building material such as bricks, mortar, cementitious materials such as hardened Portland cement and concrete, as well as paper, cardboard and such woven and non-woven fibers as glass fibers, carbon fibers and fibers from natural and synthetic polymers such as cotton, wool, linen, cellulose, rayon, nylons, aramids, polyolefins and the like.

DETAILED DESCRIPTION

As described above, various polymers and copolymers may be used in the inventive process. One of skill in the art will recognize that small quantities of a third monomer known to be copolymerizable with VDF (up to about 10% by weight of the HFP level) may also be included to provide useful terpolymers. Such known copolymerizable monomers may, for example, be selected from among C(2–8) alkenes containing at least one fluorine atom besides HFP, an alkyl vinyl ether containing at least one fluorine atom, an aliphatic or cyclic C(3–6) ketone containing fluorinated α-α' positions and non-fluorinated C(2–4) unsaturated hydrocarbons, C(3–6) alkyl vinyl ethers or C(4–6) vinyl esters.

To practice the first process aspect of the invention with the preferred fluoropolymers, a latex of the VDF-based polymers may be placed into a closed mold having a internal shape which is a mirror image of the desired outer shape of the final foam and the mold and contents chilled by any convenient means to a temperature below the freezing point of the aqueous phase.

Low crystallinity VDF-based polymers can be made by copolymerization of VDF/HFP and by substitution of one or more of tetrafluoroethylene (TFE), chlorotrifluoroethylene (CTFE), perfluoromethyl vinyl ether (PMVE), perfluoroalkyl vinyl ether (PAVE), vinyl fluoride (VF) and/or trifluoroethylene (TFE) for some or all of the hexafluoropropylene. Also contemplated as equivalents by the invention in use of the first process aspect of the invention to form shaped foams are any other low crystallinity or amorphous polymer in aqueous dispersion having coalescability below the freezing point of the dispersion.

For the coating processes contemplated by the invention, the latex of the VDF/HFP copolymers having low crystallinity or their equivalent TFE and/or CTFE containing analogs described above may be used as obtained from the reaction mixture or preferably diluted for coating fibers, woven and non-woven fabrics and for impregnating the various natural and artificial fabrics and papers contemplated by the invention or the polymer may be isolated from the latex and suspended in aqueous or nonaqueous solvents, or dissolved in suitable solvents and applied to the substrate to be treated. Suitable concentration ranges for a particular treatment on a particular substrate may readily be determined by one of skill in the art with a few well-chosen pilot treatments to optimize the coating desired.

For treatment on solid glass and metal objects, it has been found that use of the latex as obtained from the synthesis preferably with the addition of the aid of a film forming solvent and evaporation of the volatile material at elevated temperature preferably at about 110° C. or higher provides excellent, contiguous, adherent coatings.

For foam formation it has been found helpful for the VDF-based polymers where a small degree of internal crystallinity exists to add a small amount of swelling solvent such as ethyl acetate or acetone to the latex prior to placing it in the mold and freezing it.

The following examples further illustrate the best mode contemplated by the inventors for the practice of their invention and should be considered as illustrative and not in limitation thereof.

EXAMPLE 1

Preparation of Clear Air Dried Adherent Films on Glass

Vinylidene fluoride, hexafluoropropylene copolymer latexes with varying HFP levels were diluted with a convenient solvent (triethylphosphate) (TEP) and deionized (DI) water to the desired final polymer concentration. A typical amount of TEP required to obtain clear films is shown in Table I for the different HFP levels in the copolymers. Optionally, a conventional wetting agent such as BYK-346 and/or thickener, such as T-615 may be added to the latex. For comparison purposes a sample of a commercially available VDF/HFP copolymer in aqueous emulsion was also compared. The copolymer was KYNAR®2750 available from ATOFINA Chemicals, Inc.

TABLE I

| Sample No. | HFP (wt %) | Emulsion Solids concentration (wt %) | g. solvent per g. solid to obtain clear film |
|---|---|---|---|
| 1 | 46.4 | 38.55 | 0.78 |
| 2 | 36.8 | 39.85 | 1.0 |
| 3 | 26.9 | 39.91 | 0.18 |
| 4 | 16.5 | 40.03 | 0.17 |
| 5 | 16.1 | 36.55 | 0.19 |
| 6 (KYNAR 2750) | 14.0 | 28.60 | — |

The above emulsions are then coated on degreased glass or aluminum panels using a conventional draw-down bar and allowed to dry in air at room temperature. To insure complete removal of solvent, the coated substrates may be heated at 110° C. for a minimum of one hour to obtain clear film. Baking of the substrate thereafter at 250° C. for about 20 minutes results in improved adhesion. An air dried clear film with good adhesion was obtained by drawing this dispersion on a glass substrate. However, when the glass coated with the film was placed in room temperature water, the film peeled off easily. Placing the specimens of air dried films on the substrates in a convention oven at 200 to 250° C. for about 30 minutes improved adhesion. The coating remained unchanged in appearance without any discoloration or physical damage and when the substrate and coating were placed in cold water, boiling water, or in 1 molar HCl for one hour, no reduction in adhesion was observed.

EXAMPLE 2

Treatment of Woven and Non Woven Fabrics

Emulsions of VDF/HFP copolymers having HFP content ranging from 25 to 66 weight percent having about 40% by weight solids content were diluted to the concentrations shown in Tables II A, B, and C using DI water. Solutions in acetone or ethyl acetate were prepared by dissolution of isolated resin in the solvent. Substrates (paper, cloth and leather) were coated by these solutions or emulsions using a disposable pipette. In order to ensure that the coatings were free of solvent, the treated substrates were placed in a conventional oven at 85° C. for at least 10 minutes prior to making the surface energy measurements.

Surface energy measurements were conducted by using a G10 KRUSS angle contact angle measuring instrument where the surface energies were calculated using the KRUSS software using the Owens-Wendt model. The four solvents used to determine the surface energy of the coated substrates were water, ethylene glycol, tetradecane and formamide. At least four drops of each solvent were place on the dried, treated surface by a micro-syringe and the average of the observed contact angles was used by the computer to back calculate the surface energy of the treated substrate.

The results are tabulated in Tables II A, II B and II C, where the low surface energies observed illustrate the ability of the surfaces to repel water, oils, dirt and the like.

TABLE II A

Surface Energy of Paper Coated by VDF/HFP Copolymers
The paper was a filter paper (Whatman ® #1, Whatman Int'l Ltd.) used as received.

| | Concentration of polymer | Surface Energy (mJ/m$^2$) Copolymer HFP content (wt %) | | | |
|---|---|---|---|---|---|
| Medium | solid (wt %) | 27.2 | 34.4 | 47.2 | 66 |
| Acetone | 5 | | | 13.35 | |
| | 10 | | | 13.08 | 8.72 |
| | 16.5 | | | 15.33 | |
| | 20 | | | 15.66 | |
| Ethyl Acetate | 7.5 | 12.36 | 10.42 | 8.33 | |
| | 10 | 14.53 | 11.02 | 10.71 | |
| | 15 | 16.38 | 12.46 | 11.93 | |
| Emulsion | 10 | | | 8.74 | |
| | 15 | | | 9.91 | |
| | 25 | | | 10.44 | |

TABLE II B

Surface Energy of Cotton Cloth Treated with VDF/HFP Copolymers
Fabric: Bleached cotton cheesecloth, quality #90, used as received.

| | Concentration of copolymer | Surface Energy (mJ/m$^2$) Copolymer HFP Content (wt %) | | | |
|---|---|---|---|---|---|
| Medium | (wt %) | 27.2 | 34.4 | 47.2 | 66 |
| Acetate | 10 | | | 16.72 | 7.43 |
| Ethyl Acetate | 10 | 18.65 | | 15.74 | |
| Emulsion | 10 | | | 15.91 | |

TABLE II C

Surface Energy of Leather Treated with VDF/HFP Copolymers
Leather was chamois cleaned with boiling acetone.

| | Concentration of | Surface Energy (mJ/m$^2$) Copolymer HFP content (wt %) | | | |
|---|---|---|---|---|---|
| Medium | copolymer (wt %) | 27.2 | 34.4 | 47.2 | 66 |
| Acetone | 10 | — | — | — | — |
| Ethyl Acetate | 10 | 6.13 (approx. estimate) | | | |
| Emulsion | 10 | | | 15.91 | |

EXAMPLE 3

Setting rates of emulsions of the VDF/HFP copolymers having low crystallinity, VDF/HFP copolymers of high HFP content made according to the prior art known synthetic techniques, an emulsion of a commercially available, thermoplastic VDF/HFP copolymer and application of these emulsions on several stone types.

It is particularly required for use in preserving antique stone structures, monuments and the like that the consolidating/protecting material must:
1. Restore cohesion between the particles of the outermost layer of the decayed or decaying material and the underlying integral portion;
2. Provide for adequate strength of the so consolidated outermost layer;
3. Retain, in the consolidated outermost layer, characteristics of elasticity to present the formation, as occurs with many presently used products, of a stiff surface layer having mechanical characteristics different from those of the substrate;
4. Be chemically inert toward the material to be preserved/consolidated;
5. Have low volatility;
6. Show stability to the action of the atmosphere and corrosive materials carried therein, resist sunlight and heat, thereby providing long term weather ability;
7. Not alter the material's visual color or appearance;
8. Be efficiently removable if applied in excess;
9. Be easy to apply and environmentally benign;
10. Retain for a long period its own solubility to provide for treatment reversibility; and
11. Be able to be used according to the principle of minimal intervention, in order to preserve this historic and artistic value of the artifacts treated.

References on materials which have been used to consolidate and protect stony materials are contained in the book by Amoroso and Fassina, "Stony Decay and Conservation", Elsevier El, Amsterdam (1983).

A material satisfying the above criteria will, obviously, also be suitable for use in preserving other stone and masonry structures in addition to antiquities monuments and the like constructed from various stone materials such as sandstone, granite, slate, marble, ceramic and other types of tile, cement, mortar, cement conglomerates and the like.

VDF/HFP Copolymers Used for the Treatments Illustrated in this Example

Copolymers made according to the synthesis procedure for low crystallinity copolymer described hereinabove were prepared using an initial HFP content in the synthesis of 66.7 weight percent and a steady state HFP feed ratio of 35.8 weight percent (Sample 3.1), an initial HFP ratio of 66.8 weight percent and a steady state HFP feed ratio of 45.5 weight percent (Sample 3.2) and an initial HFP ratio of 75.1 weight percent and a steady state feed HFP ratio of 45.9 weight percent (Sample 3.3).

VDF/HFP copolymers were prepared according to the method of U.S. Pat. No. 3,051,677 using an initial HFP ratio of 56.6 weight percent and a steady state HFP feed ratio of 38.3 weight percent (Comparative Sample 3.1), an initial HFP ratio of 50.0 weight percent and a steady state HFP feed ratio of 36.3 weight percent (Comparative Sample 3.2) and an initial HFP ratio of 50.0 weight percent and a steady state HFP feed ratio of 45.0 weight percent (Comparative Sample 3.3).

VDF/HFP copolymers were prepared according to the method of U.S. Pat. No. 3,178,399 using an initial HFP ratio of 39.4 weight percent and a steady state HFP feed ratio of 38.1 weight percent (Comparative Sample 3.4) and using an initial HFP ratio of 49.8 weight percent and a steady state HFP feed ratio of 45.8 weight percent (Comparative Sample 3.5).

For comparison of setting time of emulsions of the various copolymers an emulsion of commercially available thermoplastic VDF/HFP copolymer (KYNAR FLEX®2750) was employed.

TABLE 3.1

Emulsion Stability of Copolymer Emulsions
The setting time (shelf life) of a material to be used in field use in treating stone and other materials is important.

| Emulsion Samples | Time Before Settling Observed |
|---|---|
| 3.1, 3.2, 3.3 | greater than 1 year |
| comparative samples 3.1, 3.2, 3.3 | 2 months |
| KYNAR FLEX | 15 days |

Spray application of Low crystallinity VDF/HFP copolymers emulsions of the type of similar to Samples 3.1, 3.2 and 3.3 on stone.

Three samples of two different lithotypes were treated by spraying a 2.5% aqueous dispersion of the VDF/HFP copolymer having 40 weight percent of IFP. The lithotypes tested were a very porous Italian limestone (Pietra di Lecce, total porosity: 32±2%, saturation index: 65±5%) and Carrara marble (total porosity: 3.8±0.2%, saturation index: 7.4±0.6%). The reduction of water absorption was determined over a time of 20 minutes according to NORMAL 11/85(EP %).

The change in color of the treated material was measured according to CIEBLAB 1976, observing angle 10°, source D65 and expressed in ΔE units. Also measured according to NORMAL 11/85 was the slope of the curve obtained by drawing a graph of water quantity absorbed per square dm vs. the square root of time (Absorption Coefficient, AC g $cm^{-2}\ s^{-1/2}$) that is related to the protection obtained. The reduction in water vapor transmission (Rp %) was measured according to NORMAL 21/85 at 30±0.5° C. and 30±1% relative.

TABLE 3.2

| | | Humidity | | | |
|---|---|---|---|---|---|
| | | AC (×105) | | | Quantity Applied |
| Lithotype | Ep % | Treated | Raw Stone | ΔE | Rp % | (g/cm²) |
| Carrara Marble | 60 ± 9 | 8.3 ± 0.1 | 11.5 ± 0.1 | 0.15 ± 0.55 | N.D. | 8.3 ± 0.5 |
| Pietradi Lecce | 92 ± 3 | 121 ± 2 | 1320 ± 10 | 1.8 ± 0.2 | 8 ± 5 | 12.4 ± 0.3 |

Brush Application of Emulsions VDF/HFP Copolymers of Low Crystallinity on Stone

Surfaces of three different lithotypes were treated with VDF/HFP copolymers of low crystallinity prepared as described hereinabove. The HFP content ranged from 25 to 40% by weight HFP. The lithotypes tested and the results are shown in table 3.3.

TABLE 3.3

| HFP Content (wt %) | EP % | | | | Application Quantity |
|---|---|---|---|---|---|
| Lithotype | 15% | 25% | 35% | 40% | (g/cm²) |
| Pietra di Leece | 9 | 16 | 64 | 58 | 15 |
| Pietra serena | 43 | 39 | 44 | 43 | 5 |
| Macedonian marble | 23 | 21 | 23 | 41 | 5 |

As a comparison three samples of Pietra di Lecce were treated by brushing a 2.5% by weight aqueous dispersion of the low crystallinity VDF/HFP copolymer having 40% by weight HFP and two emulsions of the KYNAR/FLEX emulsions contained 1:1 and 4:1 by weight of triethylphosphate (TEP) calculated on resin content to aid in film formation. The reduction in water absorption was determined and the results are shown in Table 3.4.

The protective efficiency of the low crystallinity VDF/HFP copolymer in contrast to that of the KYNAR FLEX is clearly shown.

In the absence of TEP, KYNAR FLEX has no water repellent effect on the stone and a white deposit was observed on samples treated with KYNAR FLEX.

TABLE 3.4

| Copolymer Type | Ep % |
|---|---|
| Low crystallinity VDF/HFP | 60 |
| KYNAR FLEX 2750 1:1 TEP | 18 |
| KYNAR FLEX 2750 4:1 TEP | 21 |

EXAMPLE 4

Preparation of Open Celled Polymer Foams

A general procedure for the production of foams from the latexes of VDF-based polymers is as follows:

A latex is placed in an appropriate closed mold of the described shape, the mold and its latex contents are cooled below the freezing point of the aqueous phase of the latex. The frozen latex is then removed from the mold, its temperature is allowed to rise above the melting point of the aqueous phase and the thawed aqueous phase allowed to drain from the foam which is then dried.

The following formulations were prepared:
4.1 Pure VDF/HFP copolymer having low crystallinity latex (43.7% solids by weight, 37 weight percent HFP)
4.2 Latex 4.1 (60 g) was diluted with 40 g water containing 10% by weight acetone to 29.1% solids by weight 4.3 Latex 4.1 (30 g) was diluted with 30 g of water containing 5% by weight acetone to 21.9% solids by weight.

The three formulations were placed in closed molds, conveniently 2oz polyethylene bottles, chilled until frozen, then the bottles are cut open, the frozen foam removed and placed on a drying rack. After removal of the water, a self supporting foam is recovered.

The foams are subjected to the following physical tests.

Apparent Density:

The volume is measured and the sample weighed. Density is the standard weight/volume measurements. The measurement gives an apparent density because any skin is not removed during measurement. The standard procedure is ASTM D1621-94 for this and compression testing.

Compression testing is run according to the above general procedure using an INSTRON with head speed at 0.5 in/min over 3 runs using 1.5 inch tall cylinders stress and strain at given times are measured.

Compression Set is determined according to ASTM D3573-93 but for 70 hours rather than 22

The apparent densities determined for foam from formulations 4.1, 4.2 and 4.3 are:

4.1=0.61 g/ml
4.2=0.42 g/ml
4.3=0.33 g/ml

This is in contrast to the solid polymer which has a density of about 1.8 g/ml.

Examination of a cross section of the foam under magnification reveals that in unlike the uniform curved surface of the cells of blown foam, the cells of foam formed in this manner have angular surfaces which, without being bound to any particular theory, are the mirror images of the ice crystals of the frozen aqueous phase formed during foam formation.

Reinforced Foams

Following the same above general procedure formulations analogous to formulation 4.2 but using low crystallinity VDF/HFP of 31 weight percent HFP are combined by stirring with varying amounts (0 to 4 g) of degreased fiber glass wool and the mixtures are then formed into foam.

Foam containing no glass fiber had an apparent density of 0.5 and a compression modulus of about 0.15 whereas foam containing 4.6% by weight glass fiber had an apparent density of 0.30 and a compression modulus of about 0.53.

Compression set is also reduced by the presence of the glass fibers. The coated materials and foams exhibit the inherent applied use properties of enhanced corrosion resistance, enhanced flame and heat resistance as well as lower smoke emissions.

We claim:

1. A process for the formation of an open celled polymer foam which comprises:
    a) placing a latex or aqueous suspension of a polymer having coalescability below the freezing point of the aqueous phase of said latex or suspension in a mold,
    b) chilling said mold and the latex or suspension contained therein below the freezing point of the aqueous phase of said latex or suspension,
    c) optionally removing the frozen material from the mold, and
    d) allowing the temperature of the frozen material to rise above the inciting point of the aqueous phase, and the thawed aqueous phase allowed to drain from the frozen material to permit recovery a dry, open celled polymer foam.

2. The process of claim 1 wherein said polymer is selected from the group consisting of an ethylene-vinyl acetate copolymer, a polychloroprene, a vinylidene fluoride-hexafluoropropylene copolymer, a chlorotrifluoroethylene-hexafluoropropylene copolymer, a trifluoroethylene-perfluoromethyl vinyl ether copolymer, a vinylidene fluoride-trifluoroethylene-hexafluoropropylene terpolymer and mixtures thereof.

3. The process of claim 1 wherein said open celled polymer foam comprises fibrous material, particulates, or a mixture thereof.

4. The process of claim 1 wherein said latex or aqueous suspension is a formulated latex or aqueous suspension.

5. The process of claim 4 wherein said formulated latex comprises a solvent plasticizer, surfactant, coalescing agent, or mixture thereof.

6. The process of claim 1 wherein said open celled polymer foam is crosslinked.

7. A process for the formation of an open celled polymer foam which comprises:
    a) placing a latex or aqueous suspension of a polymer having a Tg and/or a minimum film formation temperature below the freezing point of the aqueous phase of said latex or suspension in a mold,
    b) chilling said mold and the latex or suspension contained therein below the freezing point of the aqueous phase of said latex or suspension,
    c) optionally removing the frozen material from the mold, and
    d) allowing the temperature of the frozen material to rise above the melting point of the aqueous phase, and the thawed aqueous phase allowed to drain from the frozen material to permit recovery of a dry, open celled polymer foam.

* * * * *